United States Patent
Park et al.

(10) Patent No.: US 12,340,299 B2
(45) Date of Patent: Jun. 24, 2025

(54) SPARSITY-BASED NEURAL NETWORK MAPPING TO COMPUTING UNITS IN A SYSTEM-ON-CHIP

(71) Applicant: QUALCOMM Incorporated, San Diego, CA (US)

(72) Inventors: Hee Jun Park, San Diego, CA (US); Colin Beaton Verrilli, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 1034 days.

(21) Appl. No.: 17/194,202

(22) Filed: Mar. 5, 2021

(65) Prior Publication Data

US 2022/0284271 A1   Sep. 8, 2022

(51) Int. Cl.
G06N 3/063 (2023.01)
G06F 9/50 (2006.01)
G06F 11/30 (2006.01)
G06F 11/34 (2006.01)

(52) U.S. Cl.
CPC .......... *G06N 3/063* (2013.01); *G06F 9/5094* (2013.01); *G06F 11/3062* (2013.01); *G06F 11/3452* (2013.01)

(58) Field of Classification Search
None
See application file for complete search history.

(56) References Cited

U.S. PATENT DOCUMENTS

| | | | | |
|---|---|---|---|---|
| 5,777,616 A | * | 7/1998 | Bates | G06F 3/0486 715/837 |
| 5,806,072 A | * | 9/1998 | Kuba | H04N 1/2158 |
| 6,131,121 A | * | 10/2000 | Mattaway | H04M 1/57 709/227 |
| 6,760,916 B2 | * | 7/2004 | Holtz | H04N 21/4782 348/E5.022 |
| 6,970,183 B1 | * | 11/2005 | Monroe | G08B 7/062 348/E7.086 |
| 7,117,075 B1 | * | 10/2006 | Larschan | G07C 5/0858 340/439 |
| 7,236,684 B2 | * | 6/2007 | Kawakami | G11B 27/19 386/281 |
| 7,460,149 B1 | * | 12/2008 | Donovan | G06F 16/78 386/248 |
| 7,769,239 B2 | * | 8/2010 | Demos | H04N 19/36 382/233 |
| 8,131,691 B1 | * | 3/2012 | Nagaralu | G06F 16/13 707/696 |

(Continued)

OTHER PUBLICATIONS

International Search Report and Written Opinion—PCT/US2022/018954—ISA/EPO—Jun. 24, 2022.

*Primary Examiner* — Haimei Jiang

(74) *Attorney, Agent, or Firm* — Qualcomm Incorporated/Seyfarth Shaw LLP

(57) ABSTRACT

A method for an artificial neural network includes receiving a set of input values to be convolved with multiple kernels via multiple computing units. One or more thermally-stressed computing units of the multiple computing units are determined. The multiple kernels are mapped to the multiple computing units of a system-on-chip (SOC) based on the one or more thermally-stressed computing units. A convolution is performed on the set of input values and a most sparse kernel of the multiple kernels on the most thermally-stressed computing unit.

28 Claims, 13 Drawing Sheets

(56) References Cited

U.S. PATENT DOCUMENTS

| | | | |
|---|---|---|---|
| 9,533,873 B2* | 1/2017 | Rothberg | G10K 11/18 |
| 9,767,410 B1* | 9/2017 | Guevara | G10L 15/16 |
| 2002/0005895 A1* | 1/2002 | Freeman | H04N 5/772 |
| | | | 348/149 |
| 2003/0112347 A1* | 6/2003 | Wyman | H04N 5/772 |
| | | | 386/E5.072 |
| 2004/0156616 A1* | 8/2004 | Strub | H04N 5/772 |
| | | | 386/358 |
| 2004/0179815 A1* | 9/2004 | DaSilva | H04N 21/4755 |
| | | | 386/293 |
| 2004/0252193 A1* | 12/2004 | Higgins | G08G 1/042 |
| | | | 348/149 |
| 2004/0263661 A1* | 12/2004 | Okisu | H04N 1/32101 |
| | | | 348/333.02 |
| 2005/0131830 A1* | 6/2005 | Juarez | G06F 16/9535 |
| | | | 705/51 |
| 2005/0195293 A1* | 9/2005 | Kobayashi | H04N 23/635 |
| | | | 348/231.99 |
| 2005/0243171 A1* | 11/2005 | Ross | H04N 7/18 |
| | | | 348/148 |
| 2006/0007893 A1* | 1/2006 | Kaplan | H04M 19/04 |
| | | | 370/335 |
| 2006/0012683 A9* | 1/2006 | Lao | H04N 5/765 |
| | | | 348/207.99 |
| 2006/0200701 A1* | 9/2006 | Callender | G06F 11/366 |
| | | | 714/38.11 |
| 2007/0109427 A1* | 5/2007 | Satoh | H04N 23/667 |
| | | | 348/E5.042 |
| 2007/0143102 A1* | 6/2007 | Yamada | H04L 67/02 |
| | | | 704/200 |
| 2007/0150138 A1* | 6/2007 | Plante | H04N 21/44 |
| | | | 701/33.4 |
| 2007/0217761 A1* | 9/2007 | Chen | H04N 5/772 |
| | | | 386/E5.072 |
| 2007/0290830 A1* | 12/2007 | Gurley | G08B 25/14 |
| | | | 340/506 |
| 2008/0013717 A1* | 1/2008 | Brown | H04W 12/033 |
| | | | 380/30 |
| 2008/0120345 A1* | 5/2008 | Duncombe | G11B 27/11 |
| | | | 707/E17.02 |
| 2008/0180537 A1* | 7/2008 | Weinberg | H04N 23/56 |
| | | | 348/E5.029 |
| 2008/0278582 A1* | 11/2008 | Chung | H04N 7/18 |
| | | | 348/E7.085 |
| 2008/0281592 A1* | 11/2008 | McKoen | G06F 16/78 |
| | | | 704/235 |
| 2009/0024266 A1* | 1/2009 | Bertness | G01R 31/007 |
| | | | 701/22 |
| 2009/0094520 A1* | 4/2009 | Kulas | G06F 16/7867 |
| | | | 707/999.102 |
| 2009/0157736 A1* | 6/2009 | Benitez | G06F 16/48 |
| | | | 707/999.102 |
| 2009/0195655 A1* | 8/2009 | Pandey | G08B 13/19647 |
| | | | 348/158 |
| 2009/0221248 A1* | 9/2009 | Ellis | H04H 20/40 |
| | | | 455/132 |
| 2009/0322874 A1* | 12/2009 | Knutson | G08B 25/009 |
| | | | 348/143 |
| 2010/0172624 A1* | 7/2010 | Watts | H04N 5/77 |
| | | | 715/810 |
| 2011/0007139 A1* | 1/2011 | Brunetti | G08B 13/19669 |
| | | | 348/51 |
| 2011/0138395 A1* | 6/2011 | Wolfe | G06F 9/5094 |
| | | | 702/132 |
| 2014/0011428 A1* | 1/2014 | Barthold | A63H 17/26 |
| | | | 446/268 |
| 2016/0322042 A1* | 11/2016 | Vlietinck | G06N 3/08 |
| 2016/0379115 A1* | 12/2016 | Burger | G06F 15/7803 |
| | | | 706/25 |
| 2017/0074729 A1* | 3/2017 | Coutts | G05B 15/02 |
| 2017/0076195 A1* | 3/2017 | Yang | G06N 3/045 |
| 2019/0171926 A1* | 6/2019 | Chen | G06N 3/04 |
| 2019/0187775 A1* | 6/2019 | Rotem | G06F 1/324 |
| 2019/0228284 A1* | 7/2019 | Holland | G06N 3/044 |
| 2022/0036191 A1* | 2/2022 | Movshovitz-Attias | G06N 20/10 |
| 2022/0277472 A1* | 9/2022 | Birchfield | G06V 10/82 |

* cited by examiner

SPARSITY-BASED NEURAL NETWORK MAPPING TO COMPUTING UNITS IN A SYSTEM-ON-CHIP

BACKGROUND

Field

Aspects of the present disclosure generally relate to artificial neural networks, and more particularly to improved processing and mapping.

Background

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field.

Deep convolutional neural networks (DCNs) are used in various technologies, such as image recognition, speech recognition, autonomous driving, and Internet-of-Things (IoT) devices. Embedded IoT devices may have constrained resources, such as limited on-chip memory. As such, the use of DCNs on these devices may be constrained. It is desirable to improve the use of DCNs on devices with limited resources.

SUMMARY

In an aspect of the present disclosure, a method for an artificial neural network is presented. The method includes receiving a set of input values to be convolved with multiple kernels via multiple computing units. The method also includes determining one or more thermally-stressed computing units of the multiple computing units. The method additionally includes mapping the multiple kernels to the multiple computing units of a system-on-chip (SOC) based on the one or more thermally-stressed computing units. Further, the method includes performing a convolution of the set of input values and a most sparse kernel of the multiple kernels on the most thermally-stressed computing unit.

In an aspect of the present disclosure, an apparatus for an artificial neural network is provided. The apparatus includes a memory and one or more processors coupled to the memory. The processor(s) are configured to receive a set of input values to be convolved with multiple kernels via multiple computing units. The processor(s) are also configured to determine one or more thermally-stressed computing unit of the multiple computing units. In addition, the processor(s) are configured to map the multiple kernels to the multiple computing units of a system-on-chip (SOC) based on the one or more thermally-stressed computing units. Further, the processor(s) are configured to perform a convolution of the set of input values and a most sparse kernel of the multiple kernels on a most thermally-stressed computing unit.

In an aspect of the present disclosure, an apparatus for an artificial neural network is provided. The apparatus includes means for receiving a set of input values to be convolved with multiple kernels multiple computing units. The apparatus also includes means for determining one or more thermally-stressed computing units of the multiple computing units. Additionally, the apparatus includes means for mapping the multiple kernels to the multiple computing units of a system-on-chip (SOC) based on the one or more thermally-stressed computing units. Further, the apparatus includes means for performing a convolution of the set of input values and a most sparse kernel of the plurality of kernels on a most thermally-stressed computing unit.

In an aspect of the present disclosure, a non-transitory computer readable medium is provided. The computer readable medium has encoded thereon program code for an artificial neural network. The program code is executed by a processor and includes code to receive a set of input values to be convolved with multiple kernels via multiple computing units. The program code also includes code to determine one or more thermally-stressed computing units of the multiple computing units. Additionally, the program code includes code to map the multiple kernels to the multiple computing units of a system-on-chip (SOC) based on the one or more thermally-stressed computing units. Furthermore, the program code includes code to perform a convolution of the set of input values and a most sparse kernel of the plurality of kernels on a most thermally-stressed computing unit.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
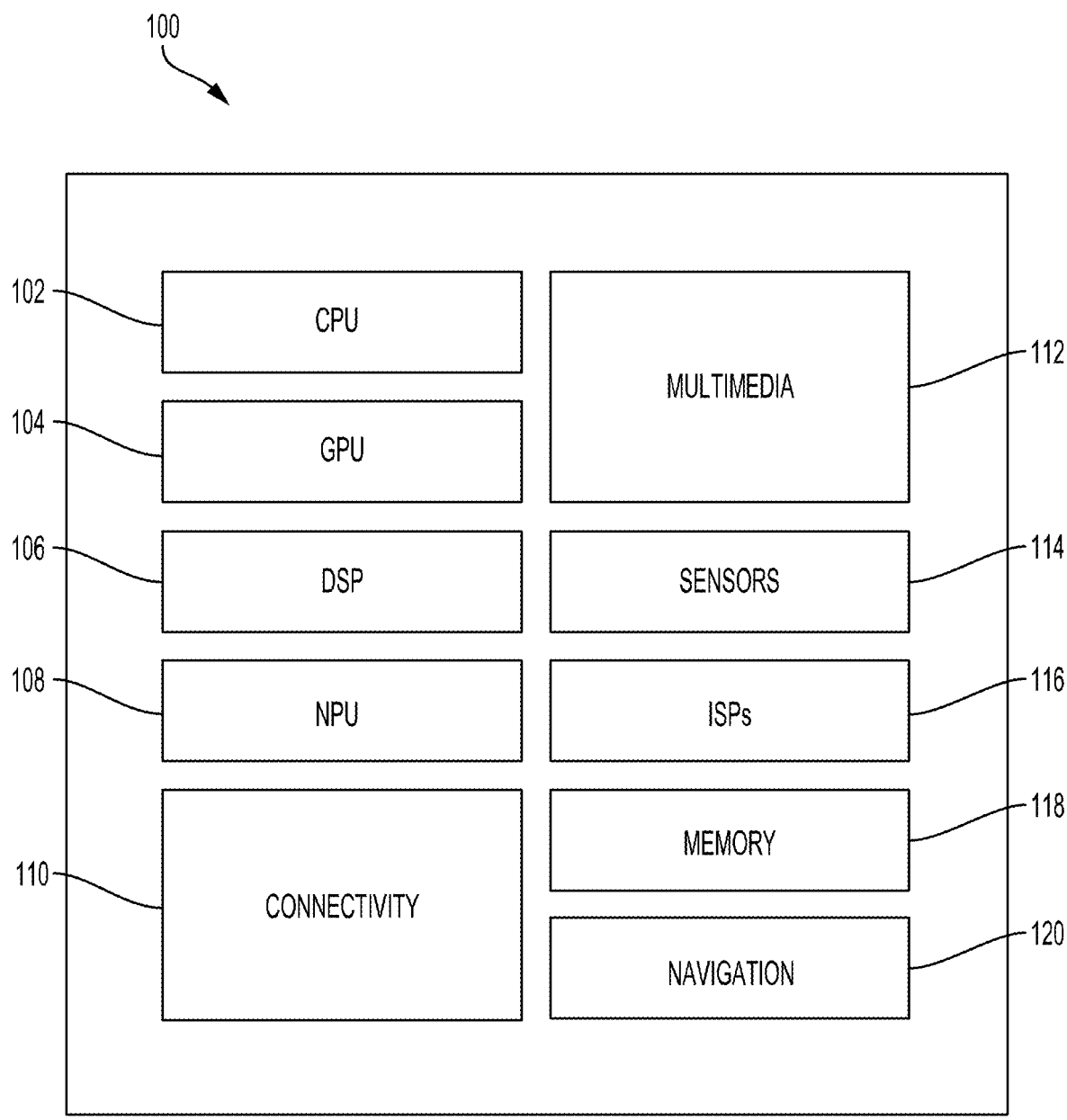
FIG. 1 illustrates an example implementation of designing a neural network using a system-on-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

A neural network may be split from one round of processing into several subparts. These subparts or portions may be referred to as tiles. The portions may be mapped to computing units, such as an artificial intelligence (AI) accelerator, tensor processing unit, neural signal processor (NSP), neural processing unit (NPU), and the like, for example. A system-on-chip (SOC) is an integrated circuit (IC) that integrates the components (e.g., processing units, memory, input/output ports, and secondary storage) of a computing system. An SOC may include one or more of such computing units on a single IC or chip for improved processing performance. As a neural network processes, the power density or temperature may not be uniform across the SOC. That is, even though tensors (matrices, tiles) of the same size are mapped to each of the computing units, some parts of the SOC may have a higher temperature than other parts of the SOC. This is because conventionally, kernel convolutions are naively assigned to computing units in a preset order.

In real world conditions, computing units on the same SOC may have different temperature and power consumption at the same operating frequency, voltage, and utilization percentage. This temperature difference may be due to differences in thermal conduction paths, on-die leakage variation, thermal coupling from other neighbor function blocks, or differences in workload encountered by the respective computing units, for example. The non-uniform temperatures (e.g., hot spots) may cause inefficiency in performance—throttling (degradation by reducing the operating frequency and execution pipelines). In some cases, a hot spot may incur thermal runaway (rapid temperature increase that is out of control), which may trigger an SOC shut down.

Aspects of the present disclosure are directed to improved processing of artificial neural networks by mapping and in some aspects dynamically mapping network partitions or tiles to computing units of an SOC based on statistical information (e.g., sparsity, sparsity percentage, or average significant bits of weight values) for kernels for each layer of the artificial neural network. For example, the remapping could occur periodically during run time, such as every 30 seconds. In some aspects, a temperature or current consumption of each computing unit may be detected and monitored. Accordingly, in some aspects, the detected temperature or current consumption may be used along with statistical information such that the mapping may be performed to reduce the detected temperature or current consumption of one or more computing units of the SOC.

FIG. 1 illustrates an example implementation of a system-on-chip (SOC) 100, which may include a central processing unit (CPU) 102 or a multi-core CPU configured for mapping neural network partitions to processing units, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to receive a set of input values to be convolved with multiple kernels via a multiple computing units. The general-purpose processor 102 may also comprise code to determine one or more thermally-stressed computing units of the multiple computing units. Additionally, the general-purpose processor 102 may comprise code to map the multiple kernels to the multiple computing units of a system-on-chip (SOC) based on the one or more thermally-stressed computing unit. The general-purpose processor 102 may further comprise code to perform a convolution of the set of input values and a most sparse kernel of the multiple kernels on a most thermally-stressed computing unit.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
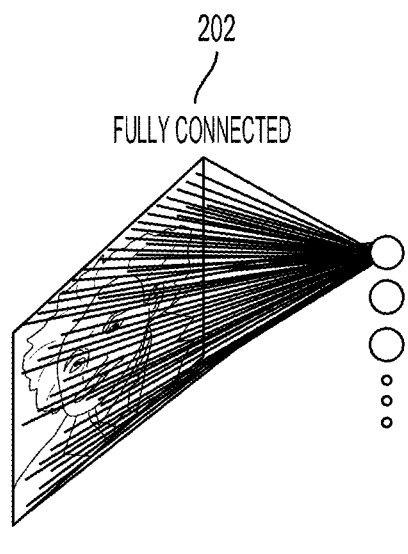
FIGS. 2A, 2B, and 2C are diagrams illustrating a neural network in accordance with aspects of the present disclosure.
Figure 2B:
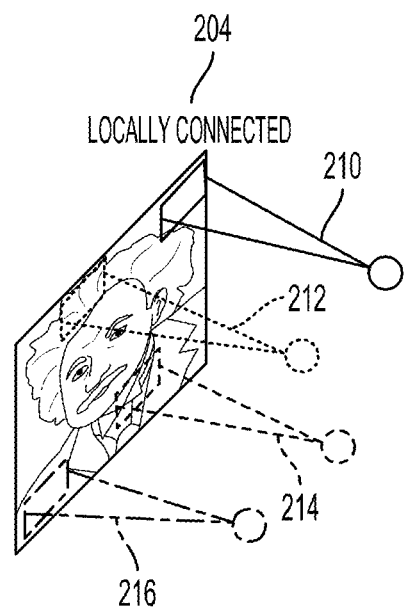

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
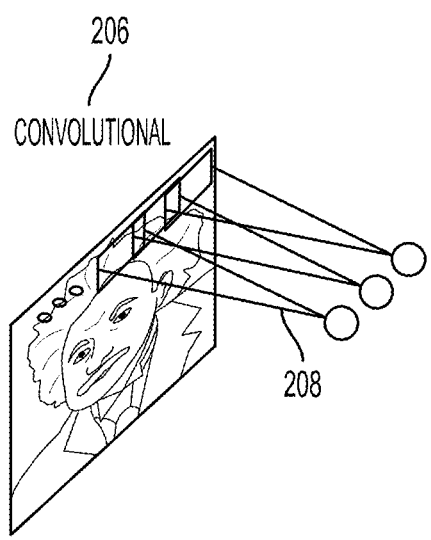

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
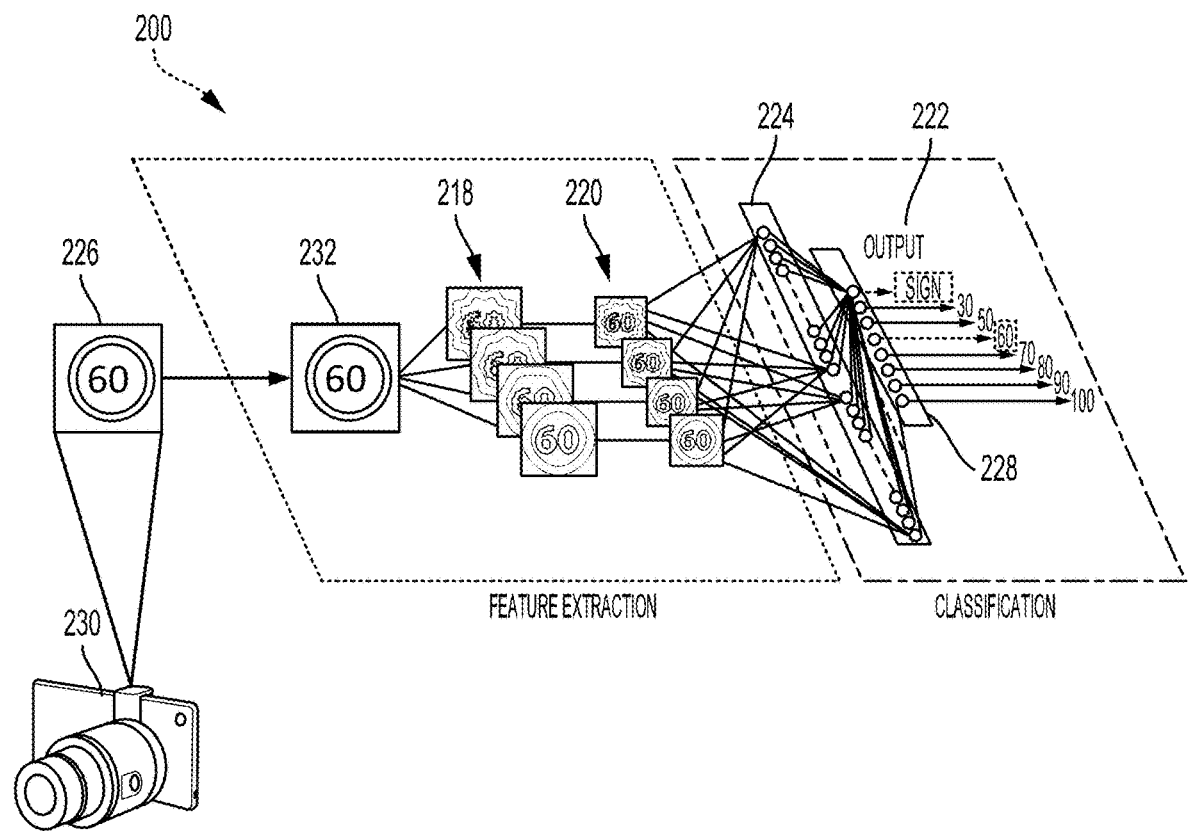
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
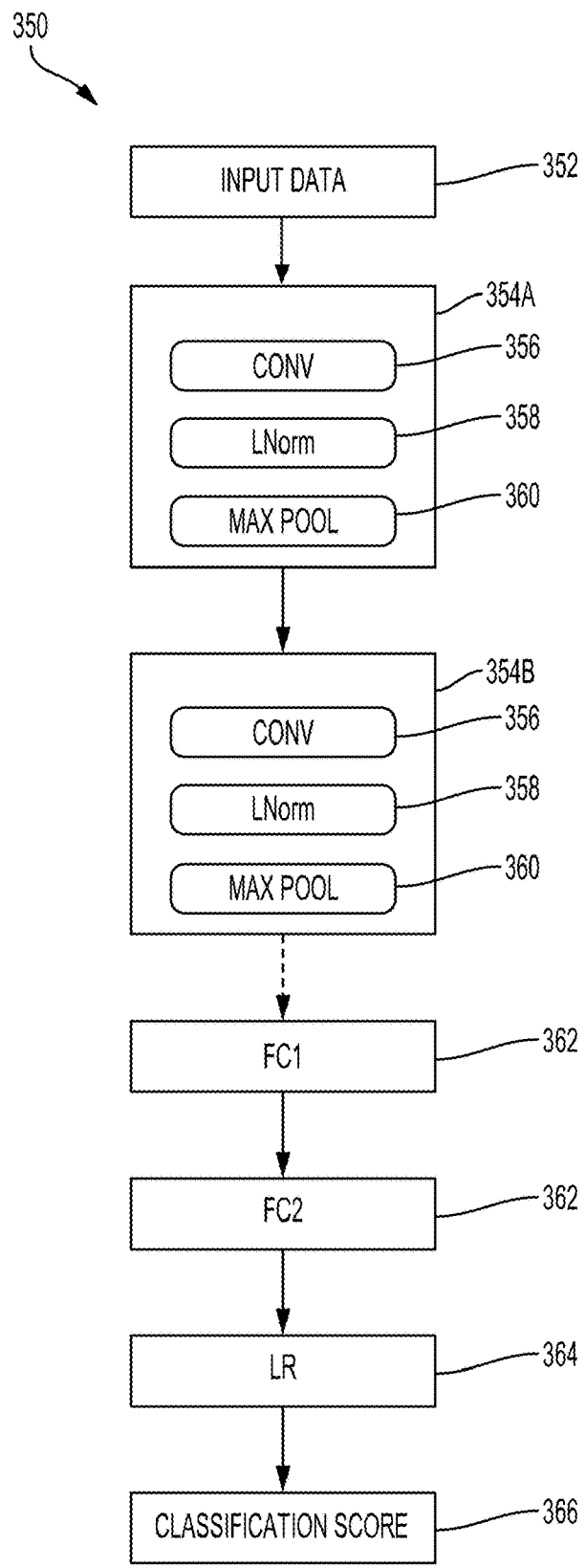
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data, including a feature from a set of features.

Figure 4:
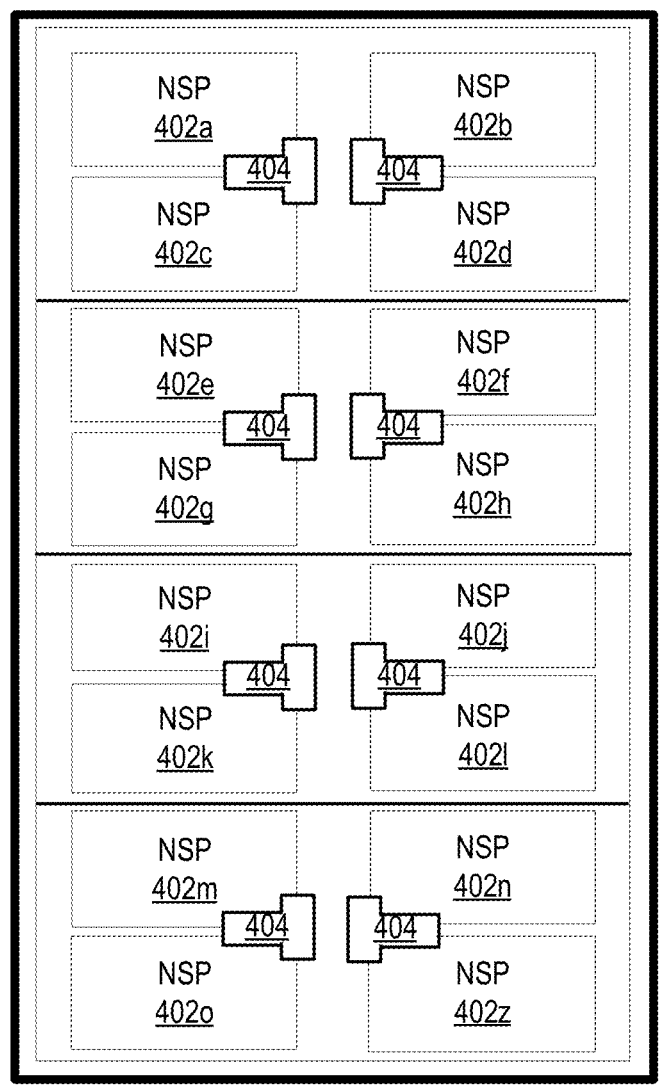
FIG. 4 is a block diagram illustrating an exemplary system-on-chip (SOC), in accordance with aspects of the present disclosure.

FIG. 4 is a block diagram illustrating a system-on-chip (SOC) 400 in accordance with aspects of the present disclosure. The SOC 400 may include one or more computing units 402a-z. Each of the computing units 402a-z, may, for example, be a neural processing unit (NPU), neural signal processor (NSP), tensor processing unit (TPU), artificial intelligence accelerator or other processing unit. The computing units (e.g., 402a-z) of the SOC 400 may be interconnected via bus 404 such that the computing units (e.g., 402a-z) may execute an artificial neural network, such as the convolutional neural network 350 of FIG. 3. However, the present disclosure is not so limiting, and a fabric, a network on a chip (NOC), or any suitable interconnect may interconnect the computing units.

The temperature and power consumption of the computing units (e.g., 402a-z) across the SOC 400 may vary. In real world conditions, computing units 402a-z on the same SOC 400 may have different temperature and power consumption at the same operating frequency, voltage, and utilization percentage. These variations may, for instance, be due to different thermal resistance and conduction paths of computing units 402a-z to the SOC 400 package (e.g., SOC floorplan), differences in heat from neighboring function blocks (e.g., neighboring computing units), on-die variations in silicon leakage (e.g., current consumption in current (Idd) quiescent state (IDDQ)), and differences in sparsity of weights in tiles mapped to computing units 402a-z.

The temperature variations (e.g., hot spots) among the computing units 402a-z may cause inefficiency in performance—throttling (degradation by reducing the operating frequency and execution pipelines). In some cases, a hot spot may result in thermal runaway (rapid temperature increase that is out of control), which may trigger an SOC shut down.

Figure 5A:
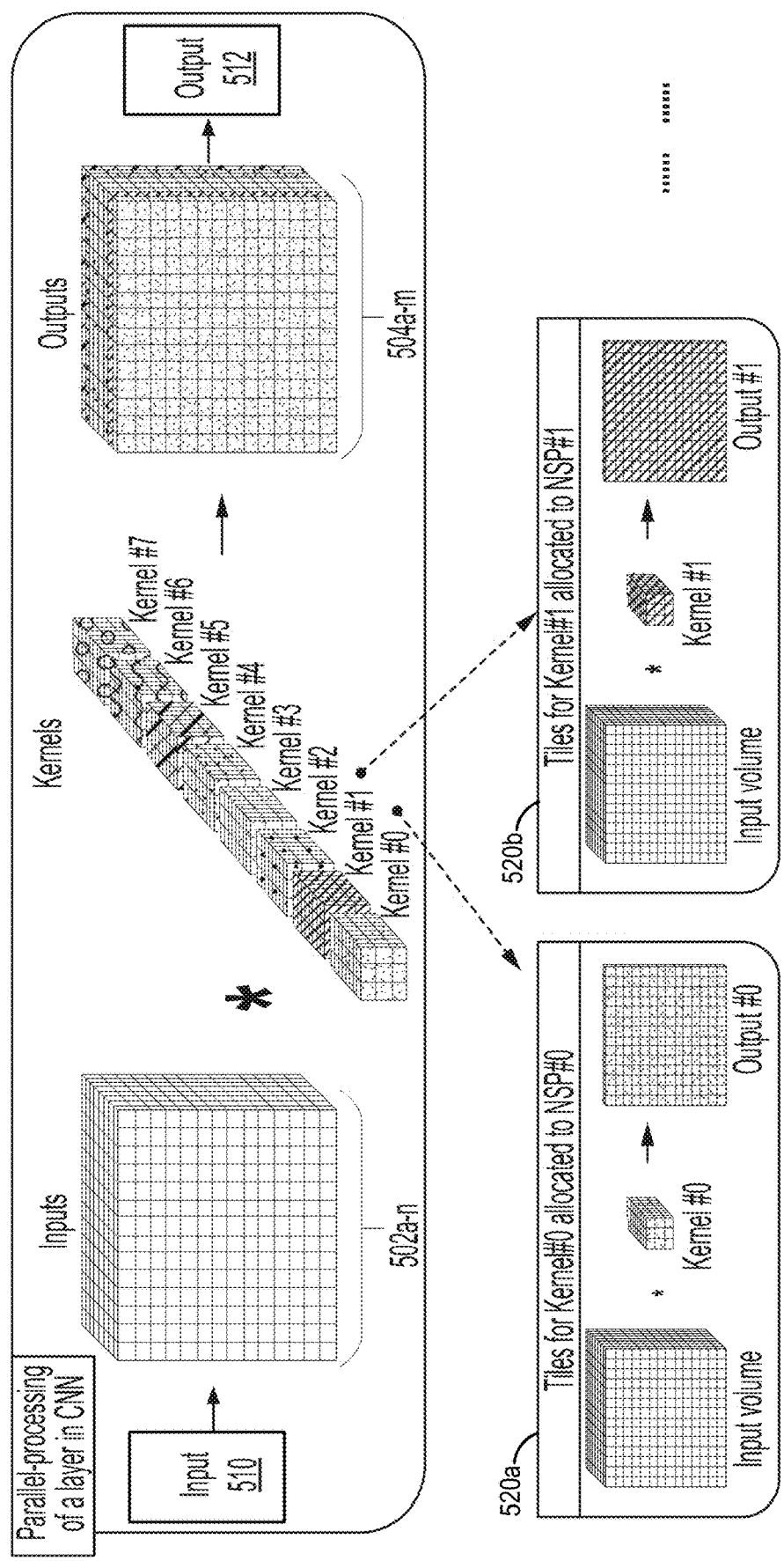
FIGS. 5A-B illustrate examples of remapping neural network partitions to computing units in a system-on-chip (SOC) according to aspects of the present disclosure.
Figure 5B:
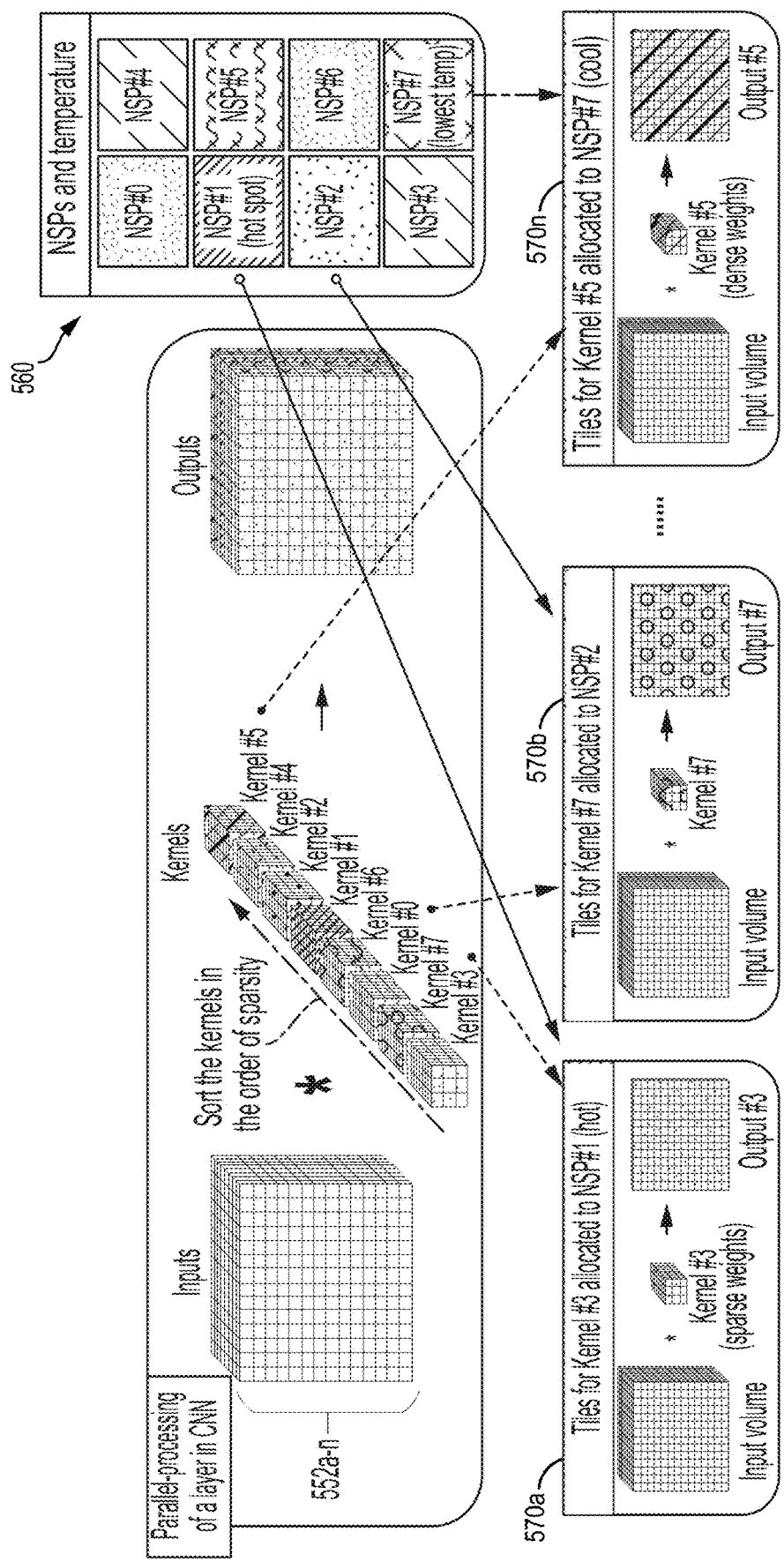

FIGS. 5A-B illustrate examples of remapping neural network partitions to computing units in an SOC according to aspects of the present disclosure. FIG. 5A is a block diagram illustrating a mapping of a neural network to computing units in accordance with aspects of the present disclosure. As shown in FIG. 5A, a set of input values 502a-n may be received via an input 510 for processing. The set of input values 502a-n may, for instance, represent an image. The set of input values 502a-n may be processed via the neural network to derive an output (e.g., an image classification). In some aspects, the input 510 may be different from, or the same as, other input blocks. The set of input values 502a-n may be convolved with a set of weight matrices or kernels (e.g., kernel #0-7) to produce a set of outputs values 504a-m via output 512. In some aspects, the output 512 may be different from, or the same as, other output blocks. The output values 504a-m may be provided as input values to subsequent layers of the neural network to operate to the neural network to perform a desired task (e.g., classification of the input image).

As illustrated in FIG. 5A, the operation of the artificial neural network may be conducted via parallel processing. The set of input values 502a-n may be considered a tile that may be mapped to individual computing units (e.g., computing units 402a-z) for performing a convolution operation. For instance, the input values 502a-n may be convolved in parallel, separately with each of the eight kernels (e.g., kernel #0-kernel #7). Each such tile-kernel convolution may be performed on a separate compute unit (e.g., 520a) to generates a layer of the output values (504a-m). For example, the operation of convolving the set of input values 502a-n with a kernel (e.g., kernel #0) to may be assigned to compute unit 520a to produce output layer #0 of the output values (e.g., 504a-m). In another example, the operation of convolving the set of input values 502a-n with kernel #1 may be assigned to compute unit 520b to produce output layer #1 of the output values (e.g., 504a-m). It should be noted that while kernels #0-7 are shown, the number of kernels is not so limited and any number of kernels may be used.

FIG. 5B illustrates operation of the artificial network conducted via parallel processing with dynamic mapping (or re-mapping) to computing units in accordance with aspects of the present disclosure. As shown in FIG. 5B, a sparsity parameter (e.g., number of zero values) of each of kernel (e.g., kernels #0-7) may be determined. In some aspects, the sparsity parameter may be a binary label for each kernel (e.g., sparse/not sparse), or a ranking of the kernel in order of sparsity (whether a specific sparsity level was calculated or not) or other sparsity measure. Having determined the sparsity of each kernel (e.g., kernels #0-7), the kernels may be sorted and arranged or ordered according to the determined sparsity (e.g., in order of decreasing sparsity). In the example of FIG. 5B, kernel #3 has the greatest sparsity among the kernels and is placed first in order. On the other hand, kernel #5 has the least sparsity among the group of kernels and is placed last in order. Accordingly, the tiles or operations of convolving the input portions or volumes (e.g., 552a-n) and the kernels (kernels #0-7) may be mapped to a computing unit (e.g., computing unit 402a-z) based on the determined sparsity order.

In some aspects, a temperature at or near each of the computing units (e.g., computing unit 402a-z) may also be detected via temperature sensors (e.g., sensors 114 in FIG.

1). Additionally, the temperature at or near the computing units may be continuously monitored in order to protect the device throughout the operation of the neural network. Element 560 is a chart illustrating graphically the temperature of the exemplary computing units NSP #0-7 of an SOC. As shown in element 560, computing unit NSP #1 has the highest temperature and is a hot spot on the SOC. On the other hand, temperature sensors (e.g., sensors 114) have detected that computing unit NSP #7 has the lowest temperature. In accordance with aspects of the present disclosure, the mapping of the neural network to computing units may be determined based on the detected temperature at or near the computing units.

By way of example only and without limitation, as shown in FIG. 5B, a tile (e.g., 570a) for an operation of convolving the kernel having the greatest sparsity (e.g., kernel #3) and corresponding input portion or volume may be allocated or mapped to the computing unit having the highest detected temperature (e.g., NSP #1). In doing so, the workload of NSP #1 may be decreased because the number of convolution operations to be performed is reduced or because kernel #3 may be the smallest of the kernels. This is because when a convolution operation includes a weight value that is zero, the corresponding multiply and accumulate operations may be skipped. Accordingly, the temperature subsequently detected at or near such computing unit (e.g., NSP #1) may be reduced. Similarly, where computing unit NSP #2 is determined to have the next highest detected temperature, a tile (e.g., 570b) for an operation of convolving the kernel having the next greatest sparsity (e.g., kernel #7) and corresponding input portion or volume (e.g., 552a-n) may be allocated or mapped to the computing unit having the next highest detected temperature (e.g., NSP #2). The re-mapping may be conducted in such fashion until all of the neural network partitions are processed. For instance, the computing unit NSP #7 is determined to have the lowest detected temperature and thus, a tile (e.g., 570n) for an operation of convolving the kernel having the least sparsity (e.g., kernel #5) and corresponding input (e.g., 552a-n) may be allocated or mapped to the computing unit having the lowest detected temperature (e.g., NSP #7). Accordingly, computing unit NSP #7 may perform the convolution of kernel #5 and the corresponding input (e.g., 552a-n) to produce the output #5. Each of the output portions may, in turn, be supplied to subsequent layers of the neural network to perform the desired task.

In this way, the temperature across the computing units (e.g., NSP #0-7) of an SOC may be balanced and, in some aspects, hot spots may be reduced. This is because temperature is correlated to power consumption and inversely correlated to (one hundred percent (100%)-sparsity percentage). That is, as the sparsity of the kernels mapped to a computing unit increases, the computations to be performed by such computing unit decrease and power consumption and temperature are reduced. Furthermore, the temperature balancing and hot spot reduction may beneficially be performed without reducing the operation frequency or stalling processing of commands or threads.

Figure 6:
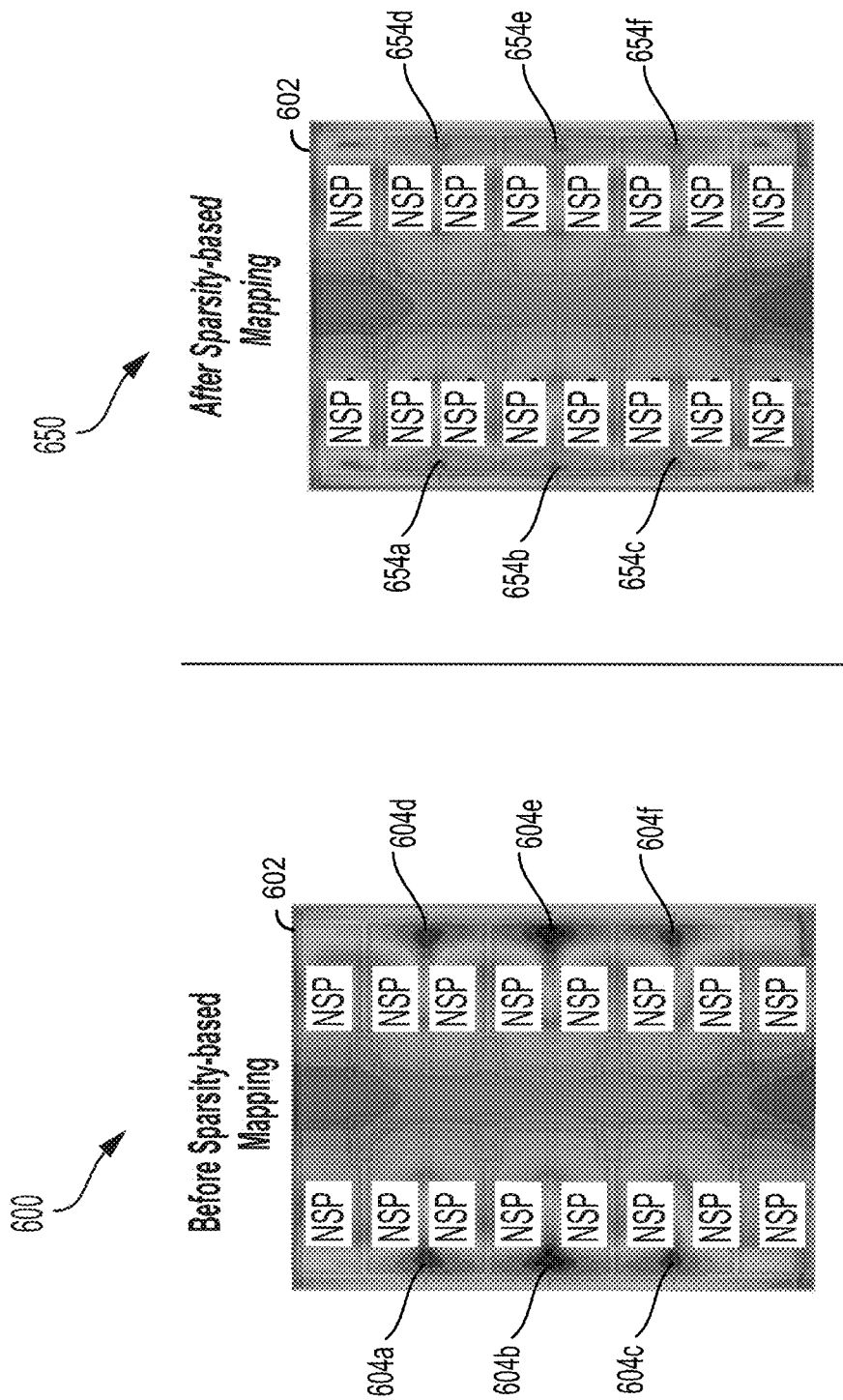
FIG. 6 illustrates a pair of example heat maps illustrating temperature balancing and hotspot reduction in accordance with aspects of the present disclosure.

FIG. 6 illustrates a pair of example heat maps showing temperature balancing and hotspot reduction in accordance with aspects of the present disclosure. Referring to FIG. 6, heat map 600 illustrates a non-uniform heat distribution of an SOC 602. Temperatures detected, for example, via one or more temperature sensors (e.g., sensors 114), may be reflected in the heat map with varying degrees of shading. The higher degree of shading (e.g., darker shading) illustrates a higher temperature in the indicated area than areas having a lower degree of shading (e.g., lighter shading). For example, areas 604a-f are shown as having a higher degree of shading than other areas of the SOC 602 and may be considered hot spots. Heat map 650 illustrates an exemplary heat distribution of the SOC 602 while processing a neural network after remapping processing of neural network partitions based on sparsity and temperature. Having remapped the processing of a neural network such that convolution operations involving kernels having higher sparsity (e.g., greater number of zero values) are mapped to computing units (e.g., NSPs) at or near the areas 604a-f of higher temperature in the heat map 600 and convolution operations involving kernels having lower sparsity (e.g., lower number of zero values) to computing units (NSPs) at or near areas of lighter shading, the corresponding areas 654a-f of the heat map 650 are shown to have a lower degree of shading. The lower degree of shading indicates a lower temperature detected for such corresponding areas 654a-f than areas 604a-f.

Figure 7:
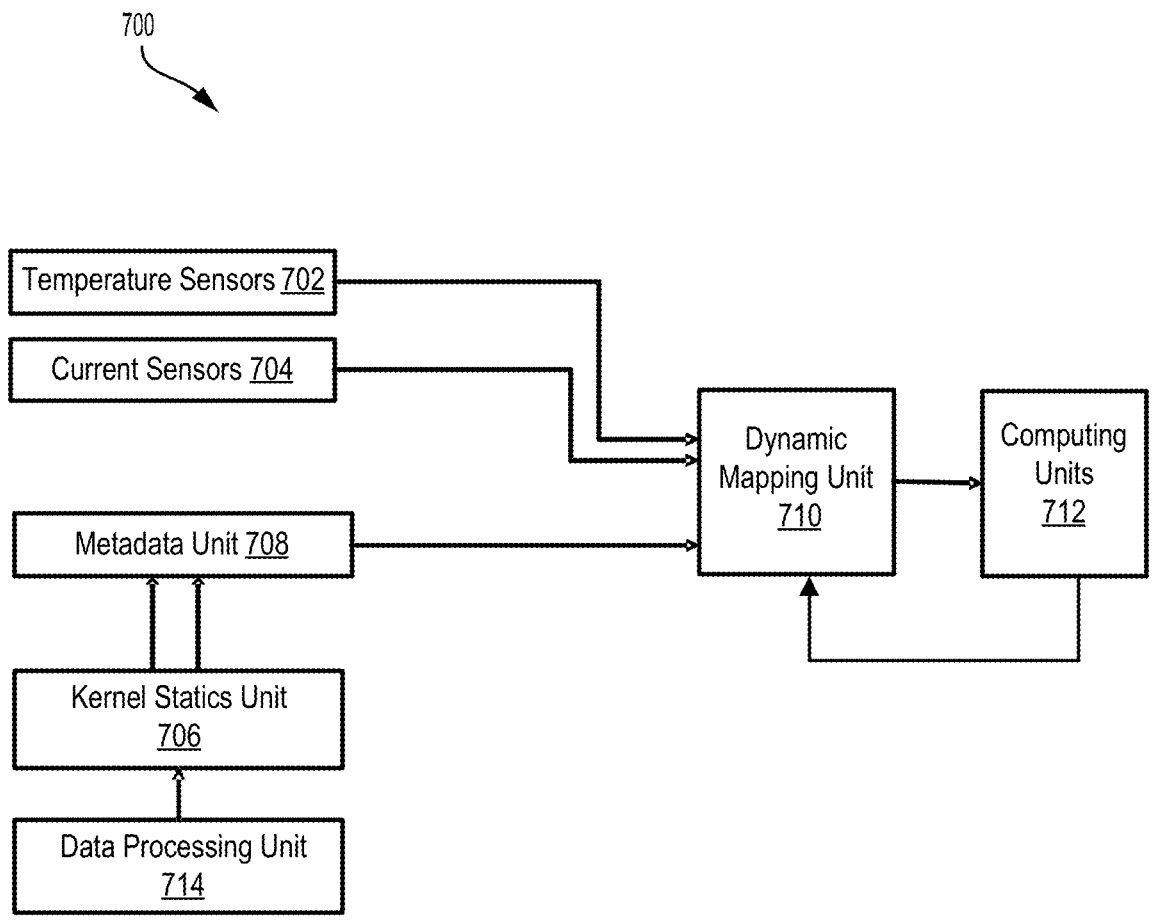
FIG. 7 is a block diagram illustrating an architecture for mapping processing of a neural network in accordance with aspects of the present disclosure.

FIG. 7 is a block diagram illustrating architecture 700 for remapping processing of a neural network in accordance with aspects of the present disclosure. Referring to FIG. 7, the architecture 700 includes temperature sensors 702, current sensors 704, a kernel statistics unit 706, a metadata unit 708, a dynamic mapping unit 710, and computing units 712. As conditions relative to an SOC (e.g., SOC 400) change during operation of the neural network, one or more temperature sensors 702 may detect the temperature of each computing unit (e.g., 402a-z) and surrounding area and/or components. Likewise, one or more current sensors 704 may detect the current consumption of each computing unit (e.g., 402a-z). The temperature sensors 702 and the current sensors 704 may respectively be used to continuously monitor the temperature and current consumption of the computing units during runtime operation of the neural network.

The kernel statistics unit 706 may compute statistics for each kernel in each layer of the neural network. The computed kernel statistics may, for example, include a sparsity of weight values in a kernel, a sparsity percentage of weight values in each kernel, and/or an average of significant bits of weights in each kernel. The computed kernel statistics may be supplied to the metadata unit 708.

A data processing unit 714 may receive kernels (weight values) of a neural network and may perform error correction, channel coding, channel or feature map pruning, intra-kernel level pruning, training to induce weight sparsity, quantization, regularization (e.g., L1 regularization), or otherwise adapt the data or kernel (e.g., weight values). The data processing may be performed prior to processing the neural network. In operation, the data processing unit 714 may provide adapted kernel information to the kernel statistics unit 706 for computation of the kernel statistics (e.g., sparsity, sparsity percentage, average significant bits, or other kernel statistics). A metadata unit 708, in turn, may receive the kernel statistics information and generate metadata that may be supplied to the dynamic mapping unit 710.

The dynamic mapping unit 710 receives the kernel statistics information (e.g., sparsity, sparsity percentage, average significant bits, and the like) included in the metadata and may allocate processing of the neural network based on the kernel statistics information. The temperature sensor 702 and current sensor 704 may respectively supply the detected temperature information and detected current information to the dynamic mapping unit 710. In turn, the dynamic mapping unit 710 may allocate computing units 712 for processing the neural network based on one or more of the temperature information, current information, and the metadata including the kernel statistic information. In some aspects, computing unit information (e.g., configuration information, processing capability, and processing workload), may be supplied to the dynamic mapping unit 710 to allocate processing of the neural network.

Figure 8:
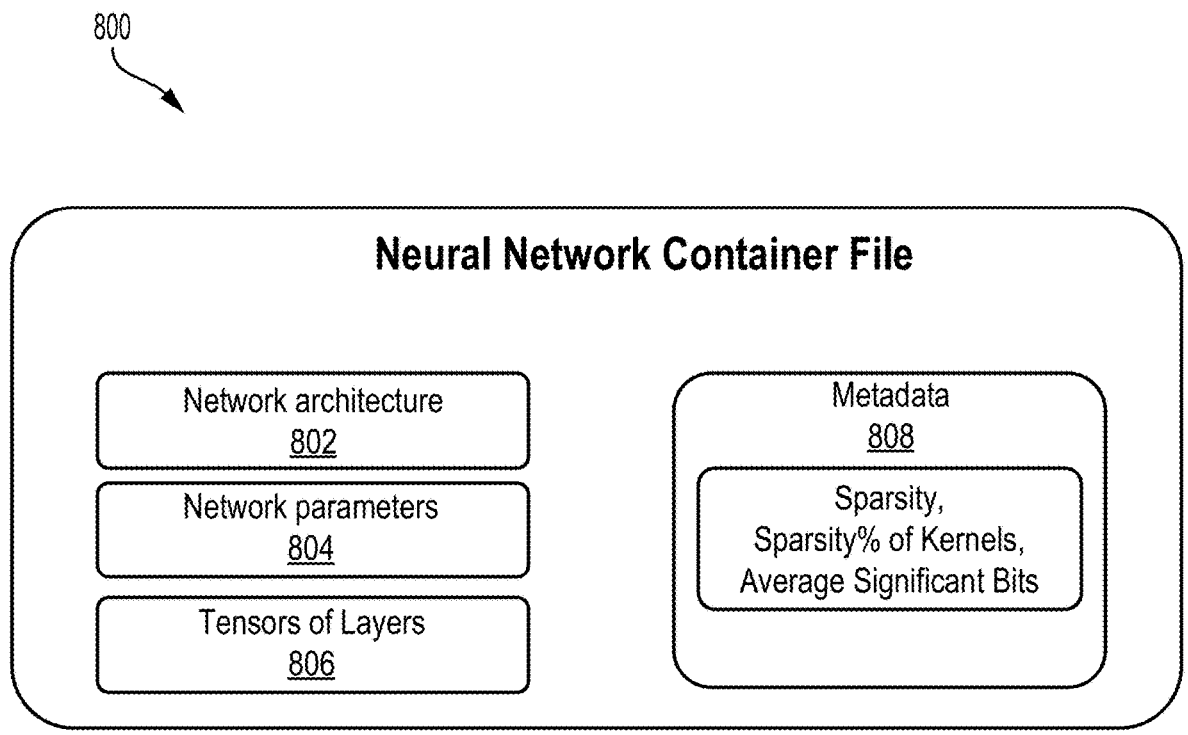
FIG. 8 is a block diagram illustrating a neural network container file in accordance with aspects of the present disclosure.

FIG. 8 is a block diagram illustrating a neural network container file 800 in accordance with aspects of the present disclosure. The neural network container file 800 may include network architecture information 802 (e.g., description of the network architecture), network parameters 804, and tensor information for layers 806 of the neural network. Additionally, the neural network container file 800 may include metadata 808, such as the kernel statistics information (e.g., sparsity, sparsity percentage of each kernels per layer, or average significant bits). In some aspects, the neural network container file 800 may be generated at compile time. Accordingly, when an SOC (e.g., SOC 400) loads the data or neural network container file 800 to memory, the information included in the neural network container file (e.g., metadata 808) may be used to dynamically determine mapping to computing units (e.g., computing units 402a-z).

Figure 9:
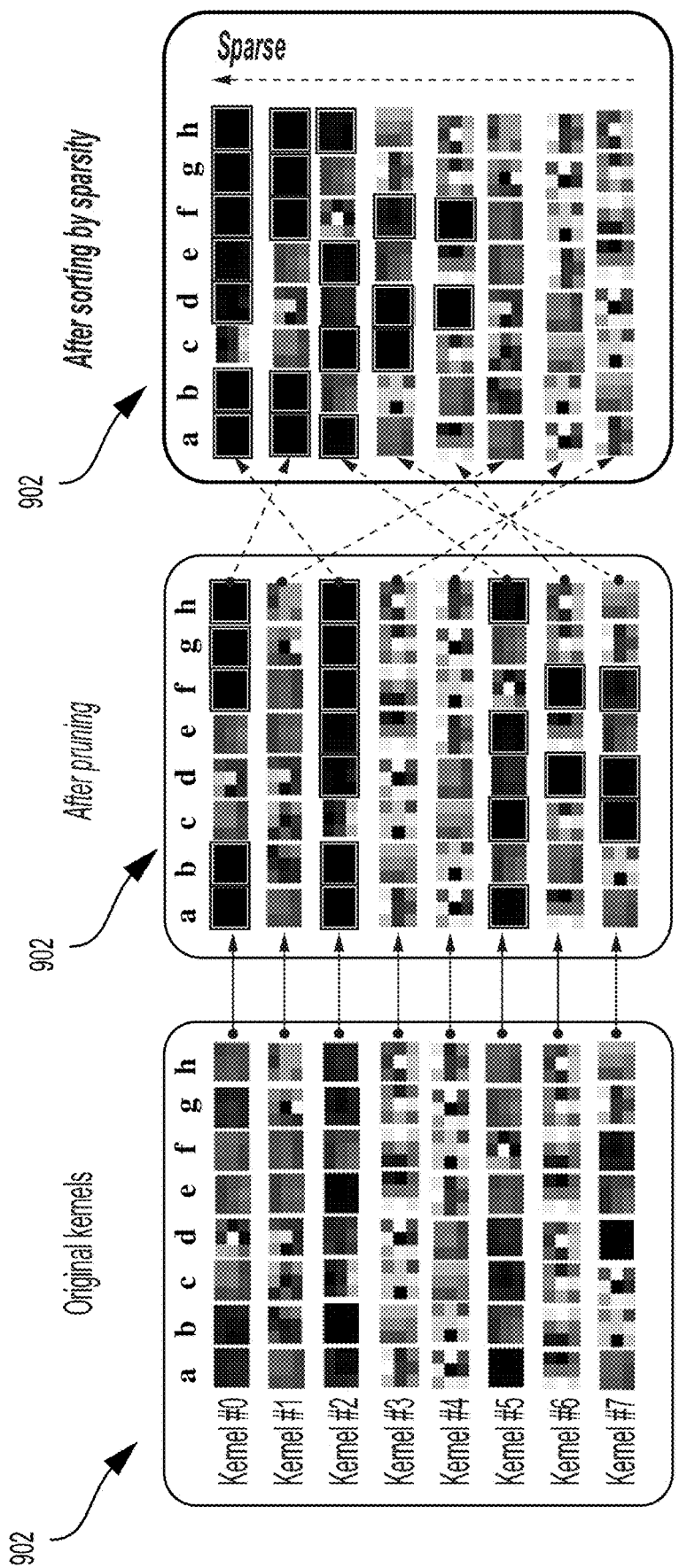
FIGS. 9A-C are a set of diagrams illustrating sparsity based remapping in accordance with aspects of the present disclosure.

FIGS. 9A-C are a set of diagrams illustrating sparsity based remapping in accordance with aspects of the present disclosure. Referring to FIG. 9A, a set of kernels 902, may for example be applied to an input image to generate a set of output values (e.g., an output feature map). The output values may be supplied to a subsequent layer of the neural network to perform a desired task (e.g., image classification). Each of the kernels 0-7 may be subjected to pruning to induce sparsity. That is, the kernels may be encouraged to have more zero values. Pruning may be applied to all kernels or on an intra-kernel basis. Additionally, pruning may be performed using a training algorithm to induce weight sparsity (e.g., iteratively setting low value weights to zero and continuing to train the network), via quantization (e.g., rounding low value weights to zero), or via regularization during training (e.g. L1 regularization), for example.

Low weight values are represented by darker shading in the set of kernels 902a. For example, in kernel 0 elements a, b, f, g, and h have darker shading indicating a low value. Likewise, in kernel 2, elements a, b, d, e, f, g, and h have a lower value.

As shown in FIG. 9B, the lower weight values of kernels 902 (shown in FIG. 9A) have been set to zero as represented by black shaded elements. For example, in kernel 0, elements a, b, f, g, and h have been set to zero as represented by black shading. Similarly, in kernel 2, elements a, b, d, e, f, g, and h have been set to zero as represented by black shading.

As shown in FIG. 9C, the set of kernels 902 may further be sorted according to sparsity. For instance, kernel 2 (in FIG. 9B) has the most sparsity (zero values indicated by black shading) among the kernels 902 and is mapped to kernel 0 (in FIG. 9C). Kernel 0 (in FIG. 9B) has the second most sparsity (zero values indicated by black shading) among the kernels 902 and is mapped to kernel 0 (in FIG. 9C). On the other hand, kernel 3 (in FIG. 9B) has the least sparsity and may be mapped to the kernel 7 (in FIG. 9C).

Figure 10:
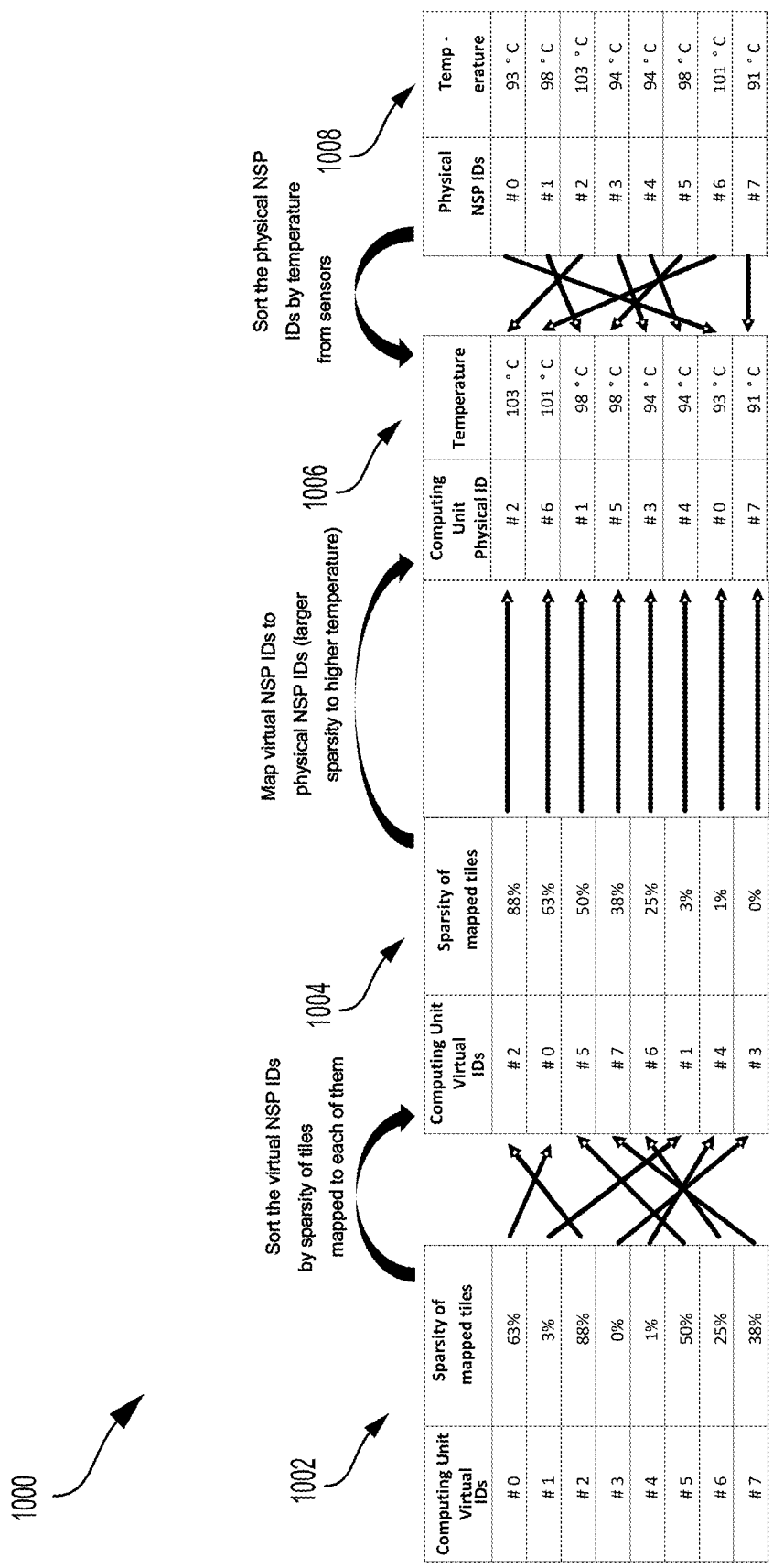
FIG. 10 is a block diagram illustrating an exemplary sparsity-based remapping applied to mitigate temperature issues in accordance with aspects of the present disclosure.

FIG. 10 is a block diagram illustrating an exemplary sparsity-based remapping applied to mitigate temperature issues in accordance with aspects of the present disclosure. A set of tiles are initially mapped to virtual IDs for a set of computing units (see 1002). The sparsity percentage for each of the mapped tiles is also provided. The virtual IDs for computing units are sorted based on the sparsity percentage of the mapped tiles 1004 Although, in this example, tiles are mapped to virtual IDs or virtual computing units, the present disclosure is not so limiting and aspects of the present disclosure may be implemented without the use of virtual computing units.

In addition, the neural network may also determine and monitor metrics regarding the condition and operation of physical computing units. In this exemplary aspect, as shown in table 1008, the temperature of each computing unit is monitored. Of course, as previously disclosed, other metrics or statistical information may be determined and/or monitored. As shown in FIG. 10, the temperature distribution among the physical computing units is non-uniform. Notably, physical computing unit 2 is operating at a temperature of 103 degrees C. while physical computing unit 7 is operating at a temperature of 91 degrees C. To improve the temperature distribution among the computing units, the temperatures may be sorted from highest to lowest and tiles may be mapped to the physical computing units based on the sparsity percentage (see table 1006). As such, computing units with the highest temperature (e.g., computing unit 2 at 103 degrees C.) are mapped to tiles with the highest sparsity percentage (e.g., virtual ID 2 at 88% sparsity) and computing units with the lowest temperature (e.g., computing unit 7 at 91 degrees C.) are mapped to tiles with the lowest sparsity percentage (e.g., virtual ID 3 with 0%). Accordingly, the temperatures of computing units of the SOC may be reduced.

Figure 11:
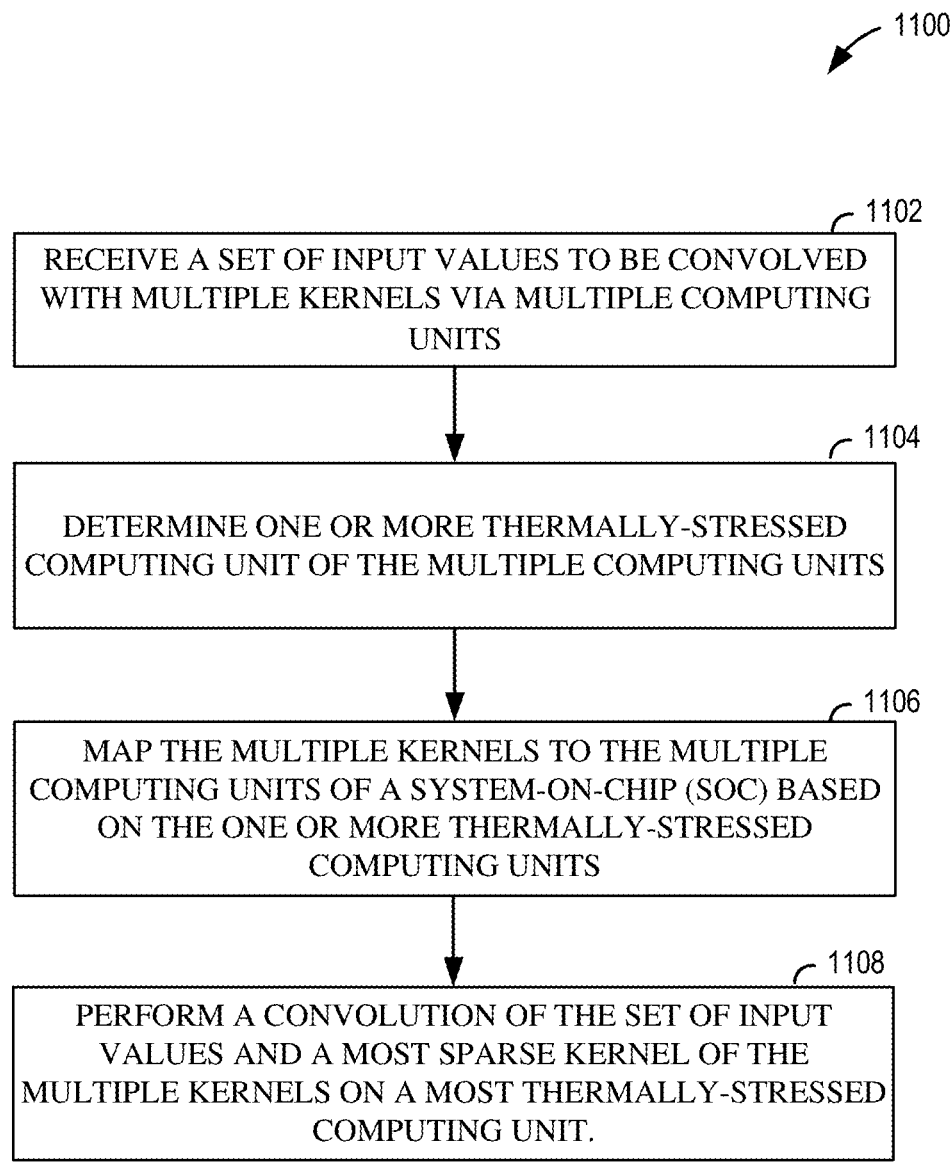
FIG. 11 illustrates a flow diagram for a method according to an aspect of the present disclosure.

FIG. 11 illustrates a flow diagram for a method 1100 according to an aspect of the present disclosure. At block 1102, the method 1100 receives a set of input values to be convolved with a plurality of kernels via a plurality of computing units. As shown in FIG. 5A, a set of input values 502a-n may be received via an input 510 for processing. The set of input values 502a-n may, for instance, represent an image. The set of input values 502a-n may be processed via the neural network to derive an output (e.g., an image classification).

At block 1104, the method 1100 determines at least one thermally-stressed computing unit of the plurality of computing units. As discussed with reference to FIG. 5B, a temperature at or near each of the computing units (e.g., computing unit 402a-z) may also be detected via temperature sensors (e.g., sensors 114 in FIG. 1). Additionally, the temperature at or near the computing units may be continuously monitored in order to protect the device throughout the operation of the neural network. Element 560 is a chart illustrating graphically the temperature of the exemplary computing units NSP #0-7 of an SOC. As shown in element 560, computing unit NSP #1 has the highest temperature and is a hot spot on the SOC. On the other hand, temperature sensors (e.g., sensors 114) have detected that computing unit NSP #7 has the lowest temperature. In accordance with aspects of the present disclosure, the mapping of the neural network to computing units may be determined based on the detected temperature at or near the computing units.

At block 1106, the method 1100 maps the plurality of kernels to the plurality of computing units of a system-on-chip (SOC) based on the at least one thermally-stressed computing unit. For instance, as shown in FIG. 5B, an operation of convolving the kernel having the greatest sparsity (e.g., kernel #3) and corresponding input portion or volume may be allocated or mapped to the computing unit having the highest detected temperature (e.g., NSP #1). In doing so, the workload of NSP #1 may be decreased because the number of convolution operations to be performed is reduced or because kernel #3 may be the smallest of the kernels. This is because when a convolution operation includes a weight value that is zero, the corresponding multiply and accumulate operations may be skipped.

At block 1108, the method 1100 performs a convolution of the set of input values and a most sparse kernel of the plurality of kernels on a most thermally-stressed computing unit. For example, as discussed with reference to FIG. 5B, the computing unit NSP #7 is determined to have the lowest detected temperature and thus, a tile (e.g., 570*n*) for an operation of convolving the kernel having the least sparsity (e.g., kernel #5) and corresponding input (e.g., 552*a-n*) may be allocated or mapped to the computing unit having the lowest detected temperature (e.g., NSP #7). Accordingly, computing unit NSP #7 may perform the convolution of kernel #5 and the corresponding input (e.g., 552*a-n*) to produce the output #5. Each of the output portions may, in turn, be supplied to subsequent layers of the neural network to perform the desired task.

In one aspect, the receiving means, the determining means, mapping means and/or the means for performing the convolution may be the CPU 102, program memory associated with the CPU 102, the dedicated memory block 118, fully connected layers 362, and/or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

Implementation examples are provided in the following numbered clauses:

1. A method for an artificial neural network, comprising:
receiving a set of input values to be convolved with a plurality of kernels via a plurality of computing units;
determining at least one thermally-stressed computing unit of the plurality of computing units;
mapping the plurality of kernels to the plurality of computing units of a system-on-chip (SOC) based on the at least one thermally-stressed computing unit; and
performing a convolution of the set of input values and a most sparse kernel of the plurality of kernels on a most thermally-stressed computing unit.

2. The method of clause 1, further comprising:
determining a first order of the computing units based on an amount of thermal stress and a second order of the kernels based on a sparsity metric; and
assigning each of the plurality of kernels to one of the plurality of computing units based on the first order and the second order.

3. The method of clause 2, in which the first order comprises the plurality of kernels in a layer arranged according to decreasing sparsity and the second order comprises the plurality of computing units arranged according to increasing thermal stress; and
assigning each of the kernels to one of the plurality of computing units in an order such that a least sparse kernel is assigned to a least thermally-stressed computing unit and a most sparse kernel is assigned to the most thermally-stressed computing unit.

4. The method of clause 1, further comprising detecting at least one of a temperature or a current consumption of each of the plurality of computing units of the SOC, and wherein the mapping is based on the temperature or the current consumption.

5. The method of clause 4, in which the mapping is performed for computing units of the plurality of computing units having a temperature or current that exceeds a threshold.

6. The method of clause 1, further comprising computing statistical information of each kernel of the plurality of kernels, and in which the mapping is further based on the statistical information.

7. The method of any of clauses 1-6, in which the mapping comprises dynamically assigning the plurality of kernels to the plurality of computing units of the SOC during runtime.

8. An apparatus for an artificial neural network, comprising:
a memory; and
at least one processor coupled to the memory, the at least one processor configured:
to receive a set of input values to be convolved with a plurality of kernels via a plurality of computing units;
to determine at least one thermally-stressed computing unit of the plurality of computing units;
to map the plurality of kernels to the plurality of computing units of a system-on-chip (SOC) based on the at least one thermally-stressed computing unit; and
to perform a convolution of the set of input values and a most sparse kernel of the plurality of kernels on a most thermally-stressed computing unit.

9. The apparatus of clause 8, in which the at least one processor is further configured:
to determine a first order of the computing units based on an amount of thermal stress and a second order of the kernels based on a sparsity metric; and
to assign each of the plurality of kernels to one of the plurality of computing units based on the first order and the second order.

10. The apparatus of clause 9, in which the first order comprises the plurality of kernels in a layer arranged according to decreasing sparsity and the second order comprises the plurality of computing units arranged according to increasing thermal stress, and
in which the at least one processor is further configured to assign each of the kernels to one of the plurality of computing units in an order such that a least sparse kernel is assigned to a least thermally-stressed computing unit and a most sparse kernel is assigned to the most thermally-stressed computing unit.

11. The apparatus of clause 8, in which the at least one processor is further configured:
to detect at least one of a temperature or a current consumption of each of the plurality of computing units of the SOC, and
to map the plurality of kernels to the plurality of computing units based on the temperature or the current consumption.

12. The apparatus of clause 11, in which the at least one processor is further configured to assign computing units of the plurality of computing units having a temperature or current that exceeds a threshold.

13. The apparatus of clause 8, in which the at least one processor is further configured:
to compute statistical information of each kernel of the plurality of kernels; and
to map the plurality of kernels to the plurality of computing units based on the statistical information.

14. The apparatus of any of clauses 8-13, in which the at least one processor is further configured to dynamically assigning the plurality of kernels to the plurality of computing units of the SOC during runtime.

15. An apparatus for an artificial neural network, comprising:
means for receiving a set of input values to be convolved with a plurality of kernels via a plurality of computing units;
means for determining at least one thermally-stressed computing unit of the plurality of computing units;
means for mapping the plurality of kernels to the plurality of computing units of a system-on-chip (SOC) based on the at least one thermally-stressed computing unit; and
means for performing a convolution of the set of input values and a most sparse kernel of the plurality of kernels on a most thermally-stressed computing unit.

16. The apparatus of clause 15, further comprising:
means for determining a first order of the computing units based on an amount of thermal stress and a second order of the kernels based on a sparsity metric; and
means for assigning each of the plurality of kernels to one of the plurality of computing units based on the first order and the second order.

17. The apparatus of clause 16, in which the first order comprises the plurality of kernels in a layer arranged according to decreasing sparsity and the second order comprises the plurality of computing units arranged according to increasing thermal stress; and further comprising means for assigning each of the kernels to one of the plurality of computing units in an order such that a least sparse kernel is assigned to a least thermally-stressed computing unit and a most sparse kernel is assigned to the most thermally-stressed computing unit.

18. The apparatus of clause 15, further comprising:
means for detecting at least one of a temperature or a current consumption of each of the plurality of computing units of the SOC; and
means for assigning the plurality of kernels to the plurality of computing units based on the temperature or the current consumption.

19. The apparatus of clause 15, further comprising means for assigning kernels of the plurality of kernels to the computing units of the plurality of computing units having a temperature or current that exceeds a threshold.

20. The apparatus of clause 15, further comprising means for computing statistical information of each kernel of the plurality of kernels, and means for assigning the kernels of the plurality of kernels to the computing units of the plurality of computing units based on the statistical information.

21. The apparatus of any of clauses 15-20, further comprising means for dynamically assigning the plurality of kernels to the plurality of computing units of the SOC during runtime.

22. A non-transitory computer readable medium having encoded thereon program code for an artificial neural network, the program code being executed by a processor and comprising:
program code to receive a set of input values to be convolved with a plurality of kernels via a plurality of computing units;
program code to determine at least one thermally-stressed computing unit of the plurality of computing units;
program code to map the plurality of kernels to the plurality of computing units of a system-on-chip (SOC) based on the at least one thermally-stressed computing unit; and
program code to perform a convolution of the set of input values and a most sparse kernel of the plurality of kernels on a most thermally-stressed computing unit.

23. The non-transitory computer readable medium of clause 22, further comprising:
program code to determine a first order of the computing units based on an amount of thermal stress and a second order of the kernels based on a sparsity metric; and
program code to assign each of the plurality of kernels to one of the plurality of computing units based on the first order and the second order.

24. The non-transitory computer readable medium of clause 23, in which the first order comprises the plurality of kernels in a layer arranged according to decreasing sparsity and the second order comprises the plurality of computing units arranged according to increasing thermal stress; and
further comprising program code to assign each of the kernels to one of the plurality of computing units in an order such that a least sparse kernel is assigned to a least thermally-stressed computing unit and a most sparse kernel is assigned to the most thermally-stressed computing unit.

25. The non-transitory computer readable medium of clause 22, further comprising:
program code to detect at least one of a temperature or a current consumption of each of the plurality of computing units of the SOC, and
program code to map the plurality of kernels to the plurality of computing units based on the temperature or the current consumption.

26. The non-transitory computer readable medium of clause 25, further comprising program code to assign computing units of the plurality of computing units having a temperature or current that exceeds a threshold.

27. The non-transitory computer readable medium of clause 22, further comprising:
program code to compute statistical information of each kernel of the plurality of kernels; and
program code to map the plurality of kernels to the plurality of computing units based on the statistical information.

28. The non-transitory computer readable medium of any of clauses 22-27, further comprising program code to dynamically assigning the plurality of kernels to the plurality of computing units of the SOC during runtime As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for an artificial neural network, comprising:
receiving a set of input values to be convolved with a plurality of kernels via a plurality of computing units of a system-on-chip (SOC);
detecting a temperature associated with each of multiple computing units of the plurality of computing units of the SOC;
mapping the plurality of kernels to the plurality of computing units of the SOC based on the detected temperature associated with each of the multiple computing units and a sparsity of each of the plurality of kernels;
performing convolution operations of the set of input values with the plurality of kernels using the plurality of computing units, wherein a most sparse kernel of the plurality of kernels is convolved with the set of input values on a computing unit associated with a greatest temperature of the multiple computing units; and
generating an inference based on the convolution operations.

2. The method of claim 1, further comprising:
determining a first order of the computing units based on the detected temperature associated with each of the multiple computing units and a second order of the kernels based on the sparsity; and
assigning each of the plurality of kernels to one of the plurality of computing units based on the first order and the second order.

3. The method of claim 2, in which the first order comprises the plurality of kernels in a layer arranged according to decreasing sparsity and the second order comprises the plurality of computing units arranged according to increasing temperature; and
assigning each of the kernels to one of the plurality of computing units in an order such that a least sparse kernel is assigned to a computing unit associated with a lowest detected temperature of the multiple computing units and the most sparse kernel is assigned to the computing unit associated with the greatest temperature of the multiple computing units.

4. The method of claim 1, further comprising detecting a current consumption of each of the plurality of computing units of the SOC, and wherein the mapping is based on the current consumption.

5. The method of claim 4, in which the mapping is performed for computing units of the plurality of computing units having a temperature or current that exceeds a threshold.

6. The method of claim 1, further comprising computing statistical information of each kernel of the plurality of kernels, and in which the mapping is further based on the statistical information.

7. The method of claim 1, in which the mapping comprises dynamically assigning the plurality of kernels to the plurality of computing units of the SOC during runtime.

8. An apparatus for an artificial neural network, comprising:
at least one memory; and
at least one processor coupled to the at least one memory, the at least one processor configured:
to receive a set of input values to be convolved with a plurality of kernels via a plurality of computing units of a system-on-chip (SOC);
to detect a temperature associated with each of multiple computing units of the plurality of computing units of the SOC;
to map the plurality of kernels to the plurality of computing units of the SOC based on the detected temperature associated with each of the multiple computing units and a sparsity of each of the plurality of kernels;

to perform convolution operations of the set of input values with the plurality of kernels using the plurality of computing units, wherein a most sparse kernel of the plurality of kernels is convolved with the set of input values on a computing unit associated with a greatest temperature of the multiple computing units; and to generate an inference based on the convolution operations.

9. The apparatus of claim 8, in which the at least one processor is further configured:
to determine a first order of the computing units based on the detected temperature associated with each of the multiple computing units and a second order of the kernels based on the sparsity; and
to assign each of the plurality of kernels to one of the plurality of computing units based on the first order and the second order.

10. The apparatus of claim 9, in which the first order comprises the plurality of kernels in a layer arranged according to decreasing sparsity and the second order comprises the plurality of computing units arranged according to increasing temperature, and
in which the at least one processor is further configured to assign each of the kernels to one of the plurality of computing units in an order such that a least sparse kernel is assigned to a computing unit associated with a lowest detected temperature of the multiple computing units and the most sparse kernel is assigned to the computing unit associated with the greatest temperature of the multiple computing units.

11. The apparatus of claim 8, in which the at least one processor is further configured:
to detect a current consumption of each of the plurality of computing units of the SOC, and wherein the mapping is based on the current consumption, and
to map the plurality of kernels to the plurality of computing units based on the temperature or the current consumption.

12. The apparatus of claim 11, in which the at least one processor is further configured to assign computing units of the plurality of computing units having a temperature or current that exceeds a threshold.

13. The apparatus of claim 8, in which the at least one processor is further configured:
to compute statistical information of each kernel of the plurality of kernels; and
to map the plurality of kernels to the plurality of computing units based on the statistical information.

14. The apparatus of claim 8, in which the at least one processor is further configured to dynamically assign the plurality of kernels to the plurality of computing units of the SOC during runtime.

15. An apparatus for an artificial neural network, comprising:
means for receiving a set of input values to be convolved with a plurality of kernels via a plurality of computing units of a system-on-chip (SOC);
means for detecting a temperature associated with each of multiple computing units of the plurality of computing units of the SOC;
means for mapping the plurality of kernels to the plurality of computing units of the SOC based on the detected temperature associated with each of the multiple computing units and a sparsity of each of the plurality of kernels;
means for performing convolution operations of the set of input values with the plurality of kernels using the plurality of computing units, wherein a most sparse kernel of the plurality of kernels is convolved with the set of input values on a computing unit associated with a greatest temperature of the multiple computing units; and means for generating an inference based on the convolution operations.

16. The apparatus of claim 15, further comprising:
means for determining a first order of the computing units based on the detected temperature associated with each of the multiple computing units and a second order of the kernels based on the sparsity; and
means for assigning each of the plurality of kernels to one of the plurality of computing units based on the first order and the second order.

17. The apparatus of claim 16, in which the first order comprises the plurality of kernels in a layer arranged according to decreasing sparsity and the second order comprises the plurality of computing units arranged according to increasing temperature; and further comprising means for assigning each of the kernels to one of the plurality of computing units in an order such that a least sparse kernel is assigned to a computing unit associated with a lowest detected temperature of the multiple computing units and the most sparse kernel is assigned to the computing unit associated with the greatest temperature of the multiple computing units.

18. The apparatus of claim 15, further comprising:
means for detecting a current consumption of each of the plurality of computing units of the SOC, and wherein the mapping is based on the current consumption; and
means for assigning the plurality of kernels to the plurality of computing units based on the current consumption.

19. The apparatus of claim 18, further comprising means for assigning kernels of the plurality of kernels to the computing units of the plurality of computing units having a temperature or current that exceeds a threshold.

20. The apparatus of claim 15, further comprising means for computing statistical information of each kernel of the plurality of kernels, and means for assigning the kernels of the plurality of kernels to the computing units of the plurality of computing units based on the statistical information.

21. The apparatus of claim 15, further comprising means for dynamically assigning the plurality of kernels to the plurality of computing units of the SOC during runtime.

22. A non-transitory computer readable medium having encoded thereon program code for an artificial neural network, the program code being executed by a processor and comprising:
program code to receive a set of input values to be convolved with a plurality of kernels via a plurality of computing units of a system-on-chip (SOC);
program code to detect a temperature associated with each of multiple computing units of the plurality of computing units of the SOC;
program code to map the plurality of kernels to the plurality of computing units of the SOC based on the detected temperature associated with each of the multiple computing units and a sparsity of each of the plurality of kernels;
program code to perform convolution operations of the set of input values with the plurality of kernels using the plurality of computing units, wherein a most sparse kernel of the plurality of kernels is convolved with the set of input values on a computing unit associated with a greatest temperature of the multiple computing units; and program code to generate an inference based on the convolution operations.

23. The non-transitory computer readable medium of claim 22, further comprising:

program code to determine a first order of the computing units based on the detected temperature associated with each of the multiple computing units and a second order of the kernels based on the sparsity; and program code to assign each of the plurality of kernels to one of the plurality of computing units based on the first order and the second order.

24. The non-transitory computer readable medium of claim 23, in which the first order comprises the plurality of kernels in a layer arranged according to decreasing sparsity and the second order comprises the plurality of computing units arranged according to increasing temperature; and further comprising program code to assign each of the kernels to one of the plurality of computing units in an order such that a least sparse kernel is assigned to a computing unit associated with a lowest detected temperature of the multiple computing units and the most sparse kernel is assigned to the computing unit associated with the greatest temperature of the multiple computing units.

25. The non-transitory computer readable medium of claim 22, further comprising:

program code to detect a current consumption of each of the plurality of computing units of the SOC, and wherein the mapping is based on the current consumption, and program code to map the plurality of kernels to the plurality of computing units based on the current consumption.

26. The non-transitory computer readable medium of claim 25, further comprising program code to assign computing units of the plurality of computing units having a temperature or current that exceeds a threshold.

27. The non-transitory computer readable medium of claim 22, further comprising:

program code to compute statistical information of each kernel of the plurality of kernels; and program code to map the plurality of kernels to the plurality of computing units based on the statistical information.

28. The non-transitory computer readable medium of claim 22, further comprising program code to dynamically assigning the plurality of kernels to the plurality of computing units of the SOC during runtime.

* * * * *